United States Patent [19]
Bateman et al.

[11] 3,983,092

[45] Sept. 28, 1976

[54] PHENYLINDANE DIAMINE MIXTURE AND EPOXY RESIN THEREWITH

[75] Inventors: John Bateman, Bardonia; David A. Gordon, Scarsdale, both of N.Y.

[73] Assignee: Ciba-Geigy Corporation, Ardsley, N.Y.

[22] Filed: Jan. 20, 1975

[21] Appl. No.: 542,144

[52] U.S. Cl............................. 260/47 EN; 260/2 N; 260/578; 252/426
[51] Int. Cl.²................... B01J 31/02; C08G 39/12; C07C 87/64
[58] Field of Search........... 260/575, 578, 580, 581, 260/2 EN, 2 N, 47 EN; 252/426

[56] References Cited
UNITED STATES PATENTS

| | | | |
|---|---|---|---|
| 2,855,420 | 10/1958 | Petropoulos | 260/578 X |
| 3,361,715 | 1/1968 | Vogt et al. | 260/563 R X |
| 3,367,911 | 2/1968 | Daum et al. | 260/563 R X |

*Primary Examiner*—Allen B. Curtis
*Attorney, Agent, or Firm*—Charles W. Vanecek

[57] ABSTRACT

A mixture of phenylindane diamines is prepared by a process comprising acid-catalyzed dimerization of α-methylstyrene and subsequent nitration and reduction of the phenylindane reaction product. This phenylindane diamine mixture is useful in polymide polymers and as a curing agent for epoxy resins.

3 Claims, No Drawings

PHENYLINDANE DIAMINE MIXTURE AND EPOXY RESIN THEREWITH

BACKGROUND OF THE INVENTION

This invention relates to a mixture of phenylindane diamines as a new composition of matter.

In an article by J. C. Petropoulos and J. J. Fisher, *J. Amer. Chem. Soc.*, 80, 1938 (1957) concerned with the dimerization of α-methylstyrene derivatives, there is reported the dinitration of

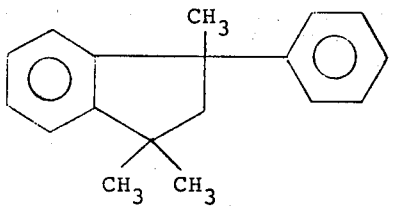

to yield 1,3,3-trimethyl-6-nitro-1-(4'-nitrophenyl)-indane in low yield. In this article there is also reported the reduction of the above pure dinitro compound to the pure diamine, 1-4'-aminophenyl)-1,3,3-trimethyl-6-aminoindane. The preparation of the above 6-nitro and 6-amino compounds is also described in U.S. Pat. No. 2,855,420. The 6-amino diamine derivative is used in U.S. Pat. No. 2,855,420 to prepare a diisocyanate and a diisothiocyanate.

It has now been discovered that a particularly useful mixture of diamines may be obtained by first preparing, through acid-catalyzed dimerization of α-methylstyrene, 1,3,3-trimethyl-1-phenylindane, and by then simply nitrating and reducing this phenylindane. In this process, the total reaction product after nitration of the above phenylindane is reduced, without any separation of specific dinitro isomers. Thus, the phenylindane diamine mixture of the present invention is produced through a much simpler procedure than that described in the above-mentioned prior art, thereby effecting a significant economy. Furthermore, the phenylindane diamine mixture so obtained has a number of exceptional properties which are unexpected in view of the prior art. For example, polymers derived from this phenylindane diamine mixture such as polyimides, polyamide-imides and polyamides, show exceptional solubility characteristics and exceptional thermal characteristics, such as high glass transition temperatures (Tg's). Furthermore, the phenylindane diamine mixture is low melting and yet epoxy resins cured by it show even higher Tg's than products cured by conventional, higher melting aromatic curing agents. This lower melting permits a much simplified casting procedure to be used in an epoxy resin/aromatic amine system.

DETAILED DISCLOSURE

The phenylindane diamine mixture of this invention may in general, be represented by the formula

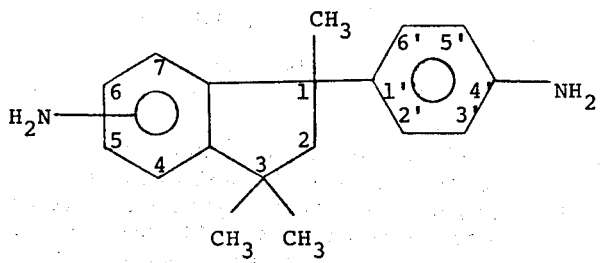

There may be present in this mixture from 10 to 80% of 5-amino-1-(4'-aminophenyl)-1,3,3-trimethylindane and from 90 to 20% of 6-amino-1-(4'-aminophenyl)-1,3,3,-trimethylindane. The mixture preferably contains from approximately 15 to 50% 5-amino and from 85 to 50% 6-amino-1-(4'-aminophenyl)-1,3,3-trimethylindane. While spectral analysis indicates that the 6-amino and 5-amino isomers predominate in the phenylindane mixture of this invention, it should be understood that the mixture could contain minor amounts of other components, e.g., other diamino isomers.

The phenylindane diamine mixture of this invention may be prepared through the acid-catalyzed dimerization of α-methylstyrene to produce the phenylindane. Then, by subsequent nitration and reduction of the phenylindane, the phenylindane diamine mixture is produced. The preparation of the phenylindane diamine mixture is described in U.S. Pat. No. 3,856,752, Dec. 24, 1974, the teachings of which patent pertaining to said mixture are incorporated herein by reference.

The phenylindane diamine mixture of this invention may be used in the preparation of high molecular weight polyamide-imides, polyimides, polyesters-imides and azo polymers.

For example, the mixture of diamines can be reacted with dianhydrides such as benzophenonetetracarboxylic acid dianhydride, pyromellitic dianhydride or biphenyltetracarboxylic acid dianhydride, to form polyamic acids which can be dehydrated by any of several techniques to polymides, a class of thermally stable polymers. These polyimides, unlike previously known polyimides, are highly soluble in polar solvents and show very high glass transition temperatures (Tg). The phenylindane diamine mixture may also be admixed with other non-related diamines before reacting with dianhydrides to form "copolyimides." These copolyimides generally are less soluble than the previously described polyimides but show other desirable properties for specific applications. Phenylindane diamine polyimides are described in greater detail in U.S. Pat. No. 3,856,752.

The phenylindane diamines may also be used to prepare polyamides by reaction with dicarboxylic acid derivatives. Such polyamides generally show increased solubility and higher Tg's compared to polyamides prepared from previously known diamines. Polyamide-imides soluble in the closed (imidized) form may also be prepared from the phenylindane diamines and a tricarboxylic acid derivative such as trimellitic anhydride. Extremely high Tg's are obtained with these systems.

The phenylindane diamine mixture of this invention is useful as a hardener for epoxy resins. It is known that aromatic diamines, when used as hardeners for epoxy resins, impart excellent properties to the cured resin for certain applications. Generally, high chemical resistance, high heat stability, and high heat distortion tem-

I peratures are obtained (see H. Lee and K. N. Neville, "Handbook of Epoxy Resins," McGraw-Hill, Inc. 1967, Chapter 8). However, previously known diamines are high melting solids which have to be heated to be dissolved in the resin and the mixture has to be kept at an elevated temperature while being worked to prevent crystallization. This is undesirable for several reasons. First, the pot life of the system is greatly reduced; second, the exotherm of the reaction is harder to control; and third, noxious fumes are given off from the hot diamine. In casting operations, the danger of an uncontrollable exotherm occurring limits the size of casting. Several methods have been developed to circumvent these problems, but all suffer from serious disadvantages. For example, U.S. Pat. No. 2,904,530 discloses the use of supercooled liquid mixtures of aromatic diamines as epoxy resin hardeners. These mixtures do indeed aid in the processing of epoxies but suffer the disadvantage of a great tendency to crystallize, and frequently require reheating and careful supercooling before use. The use of liquid aliphatic or aralkyl amines in combination with aromatic amines results in loss of the desirable properties provided by the aromatic diamines.

Due to the low melting point and ready solubility of the phenylindane diamine mixture, the problems associated with epoxy resin/aromatic amines outlined above may be avoided. The diamine mixture of the present invention may be mixed with conventional epoxy resins at or near room temperature. The present invention also allows heat activated catalysts to be used with the system to obtain a quicker cure when desired.

Quite unexpectedly it has been found that epoxy resins cured with the phenylindane diamine mixture display higher glass temperatures (Tg) than resins similarly cured with other aromatic diamines. This is quite surprising in light of the low melting point of the phenylindane diamine mixture.

The phenylindane diamine mixture may be used to crosslink maleic anhydride resins, isocyanate resins, or to vulcanize rubber and chlorinated rubber. The mixture may also be used as an intermediate to produce isocyanates, polyepoxides, azo dyes and the like.

To further illustrate the nature of this invention and process employed in preparing the phenylindane diamine mixture, the following examples are given below:

EXAMPLE 1

1,3,3-Trimethyl-1-phenylindane

To 6.0 kg. of 62% sulfuric acid at 50°C was added 1.0 kg. of α-methyl styrene over a 5 minute period. The mixture was refluxed (145°C) for 20 hours. After cooling, the lower acid phase was drawn off and discarded. The organic phase was washed with sulfuric acid several times and then with water several times. The product was recrystallized from methanol which afforded 750 g of white crystals with a melting point of 50.5°–52.0°C. The yield was 75%.

EXAMPLE 2

Preparation of 5,4'-dinitro- and 6,4'-dinitro-1,3,3-trimethyl-1-phenylindane isomers To a solution of 236 g (1.0 mole) 1,3,3-trimethyl-1-phenylindane (α-methylstyrene dimer) in 750 ml chloroform at a 2°–8°C was added to previously mixed solution of 396 ml sulfuric acid and 132 ml nitric acid dropwise over a 2.5 hour period. The two phase reaction mixture was allowed to stir and additional 4 hours at 5°C. The chloroform phase was isolated and washed with aqueous sodium bicarbonate until neutral and then with distilled water. A light yellow oil was obtained after drying and stripping the chloroform solution. Two triturations in hexane at room temperature afforded 295 g light yellow powder, melting point 109°–125°C. This material was shown to be a mixture of dinitro-1,3,3-trimethyl-1-phenylindane isomers by spectral analysis.

Analysis for $C_{18}H_{18}N_2O_4$: % Calculated: C, 66.25; H, 5.55; N, 8.58. % Found: C, 66.13; H, 5.50; N, 8.42.

EXAMPLE 3

Preparation of 5(6)-Amino-1-(4'-aminophenyl)-1,3,3-trimethylindane

A mixture of 250 g (0.767 mole) of the dinitro isomers and 250 g (4.60 g - atoms) reduced iron powder in 1 liter 50% aqueous ethanol was brought to reflux and a previously prepared solution of 60 ml concentrated hydrochloric acid in 400 ml 50% aqueous ethanol was added over a 1 hour period. Reflux was continued an additional 3 hours, the reaction cooled to 50° and 50 ml concentrated hydrochloric acid added. The reaction mixture was filtered. The filtrate was made basic with 20% NaOH and extracted with ether, dried and stripped under vacuum to afford 145 g (71%) of a clear brown glassy solid, melting point 47°–54°. NMR analysis indicated the product was 62% 6-amino- and 38% 5-amino-1-(4'-aminophenyl)-1,3,3-trimethylindane.

Analysis for $C_{18}H_{22}N_2$: % Calculated: C, 81.18; H, 8.32; N, 10.52. % Found: C, 81.27; H, 8.20; N, 10.48.

EXAMPLE 4

Preparation of Polyimide from 5(6)-Amino-1-(4'-aminophenyl)-1,3,3-trimethylindane and Benzophenonetetracarboxylic acid dianhydride To a solution of 5.33 g (20 mmoles) of 5(6)-amino-1(4'-aminophenyl)-1,3,3-trimethylindane as prepared in Example 3 in 67 g N-methylpyrrolidone (NMP) was added 6.44 g (20 m moles) benzophenonetetracarboxylic acid dianhydride (BTDA) over a 20 minute period. After 24 hours at room temperature, 20 ml acetic anhydride and 5 ml pyridine were added to imidize the amic acid polymer. Coagulation into acetone afforded a 10.2 g (93%) yellow polyimide with an inherent viscosity (0.5%, NMP, 25°) 0.55; 40% solubility in chloroform, N-methylpyrrolidone, dimethylformamide; TGA main break (5°/min.) 425°C in air, 500°C in nitrogen; Tg (TBA) 320°C.

EXAMPLE 5

Curing of Epoxy Resins with 5(6)-Amino-1-(4'-aminophenyl)-1,3,3-trimethylindane

A liquid diepoxide consisting of about 85% diglycidyl ether of bisphenol A and about 15% oligomers of bisphenol A and epichlorohydrin and having a W.P.E. of 185–196 was mixed with 38.5 phr 5(6)-amino-1-(4'-aminophenyl)-1,3,3-trimethylindane (PIDA) and coated on glass braids designed to be used in a Torsional Braid Analyzer (TBA). There braids were cured in an oven until fully crosslinked and placed in the TBA for measurement of Tg. Similarly, other diamines were used to cure the same diepoxide with a constant ratio of amine equivalent/epoxide equivalent. The following table shows the results of this study:

| Amine | Mp | phr | Cure Temperature | Tg |
|-------|------|------|------------------|------|
| PIDA | 47–54° | 38.5 | 150° | 172° |
| PIDA | 47–54° | 38.5 | 162° | 177° |
| MDA[a] | 91–93° | 28.7 | 150° | 165° |
| MDA | 91–93° | 28.7 | 162° | 167° |
| MPDA[b] | 64–66° | 15.6 | 150° | 152° |
| MOCA[c] | 104–7° | 38.7 | 150° | 152° |
| DAPS[d] | 170–80° | 36.0 | 150° | 167° |

[a] 4,4'-methylenedianiline
[b] m-phenylenediamine
[c] 4,4'-methylenebis-(o-chloroaniline)
[d] 4,4'-diaminodiphenyl sulfone

What is claimed is:

1. A phenylindane diamine mixture having the formula

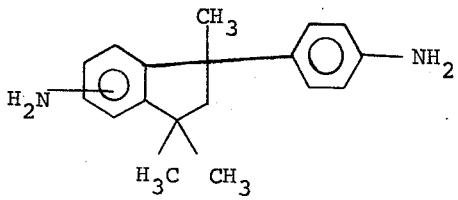

said mixture comprising 15 to 50% 5-amino-1-(4'-aminophenyl)-1,3,3-trimethylindane and 85 to 50% 6-amino-1-(4'-aminophenyl)-1,3,3-trimethylindane.

2. A mixture according to claim 1 comprising approximately 38% 5-amino-1-(4'-aminophenyl)-1,3,3-trimethylindane and approximately 62% 6-amino-1-(4'-aminophenyl)-1,3,3-trimethylindane.

3. A composition of matter which is comprised of (a) an epoxy resin and (b) the phenylindane diamine mixture of claim 1.

* * * * *